(12) United States Patent
Kunihiro et al.

(10) Patent No.: US 11,084,124 B2
(45) Date of Patent: Aug. 10, 2021

(54) LASER CUTTING NOZZLE AND LASER CUTTING METHOD

(71) Applicant: AMADA HOLDINGS CO., LTD., Kanagawa (JP)

(72) Inventors: Masato Kunihiro, Kanagawa (JP); Akihiko Sugiyama, Kanagawa (JP); Hiroaki Ishiguro, Kanagawa (JP); Hironobu Miyoshi, Kanagawa (JP); Ryohei Ito, Kanagawa (JP); Yuya Mizoguchi, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/629,424

(22) PCT Filed: Jun. 5, 2018

(86) PCT No.: PCT/JP2018/021582
§ 371 (c)(1),
(2) Date: Jan. 8, 2020

(87) PCT Pub. No.: WO2019/021641
PCT Pub. Date: Jan. 31, 2019

(65) Prior Publication Data
US 2020/0147722 A1    May 14, 2020

(30) Foreign Application Priority Data
Jul. 28, 2017 (JP) .............................. JP2017-146747

(51) Int. Cl.
*B23K 26/14* (2014.01)
*B23K 26/38* (2014.01)

(52) U.S. Cl.
CPC ...... *B23K 26/1476* (2013.01); *B23K 26/1482* (2013.01); *B23K 26/38* (2013.01)

(58) Field of Classification Search
CPC ............ B23K 26/1476; B23K 26/1482; B23K 26/38; B23K 26/1411; B23K 26/1464;
(Continued)

(56) References Cited

U.S. PATENT DOCUMENTS

| 5,609,781 A | 3/1997 | Kaga et al. |
| 6,118,097 A | 9/2000 | Kaga et al. |

(Continued)

FOREIGN PATENT DOCUMENTS

| JP | 6-190582 | 7/1994 |
| JP | 9-507657 | 8/1997 |

(Continued)

OTHER PUBLICATIONS

Chinese Official Action issued in CN Application No. 201880049458.2, dated Jan. 11, 2021.
(Continued)

*Primary Examiner* — Phuong T Nguyen
*Assistant Examiner* — Yeong Juen Thong
(74) *Attorney, Agent, or Firm* — Greenblum & Bernstein, P.L.C.

(57) ABSTRACT

A laser cutting nozzle includes an inner nozzle and an outer nozzle. The inner nozzle exhibits a tube shape having a through hole on an axis and having a diameter decreasing on a first end portion side and includes a notch extending in the axis direction along an outer peripheral surface on a second end portion side. The outer nozzle is fitted to the outer peripheral surface of the inner nozzle and includes a vent passage including the notch and communicating between the first end portion and the second end portion in the axis direction. A minimum flow cross-sectional area of the vent passage matches an opening area of the notch in an end surface on the second end portion side.

4 Claims, 11 Drawing Sheets

(58) Field of Classification Search
CPC ............. B23K 26/144; B23K 26/342; B23K 26/1405; B23K 26/1488
USPC ........... 219/121.64, 121.67, 121.72, 121.84, 219/121.6, 121.63, 121.73, 121.75
See application file for complete search history.

(56) References Cited

U.S. PATENT DOCUMENTS

| | | | |
|---|---|---|---|
| 2005/0109745 A1* | 5/2005 | Wessner | B23K 26/0643 219/121.84 |
| 2015/0196975 A1* | 7/2015 | Sato | B23K 26/1476 239/135 |
| 2017/0120381 A1* | 5/2017 | Orlandi | B23K 26/14 |

FOREIGN PATENT DOCUMENTS

| | | |
|---|---|---|
| JP | 2000-351090 | 12/2000 |
| JP | 2001-300753 | 10/2001 |
| JP | 2001-314986 | 11/2001 |
| JP | 3749356 | 2/2006 |
| JP | 5933853 B1 | 6/2016 |

OTHER PUBLICATIONS

Official Communication issued in International Bureau of WIPO Patent Application No. PCT/JP2018/021582, dated Aug. 28, 2018.
Office Action issued in Japan Counterpart Patent Appl. No. 2019-081254, dated Sep. 19, 2019.

* cited by examiner

| THICKNESS T | FLOW RATIO Q | NOZZLE No. |
|---|---|---|
| T11 | Q11 | 511 |
| T12 | Q12 | 512 |
| T13 | Q13 | 513 |
| T14 | Q14 | 514 |
| T15 | Q15 | 515 |

| THICKNESS T | FLOW RATIO Q | NOZZLE No. |
|---|---|---|
| T21 | Q21 | 521 |
| T22 | | |
| T23 | | |
| T24 | Q22 | 522 |
| T25 | | |

LASER CUTTING NOZZLE AND LASER CUTTING METHOD

TECHNICAL FIELD

The present disclosure relates to a laser cutting method, a laser cutting nozzle, and a method of manufacturing a laser cutting nozzle.

BACKGROUND ART

As a processing nozzle used for laser cutting, a double nozzle in which an inner nozzle and an outer nozzle are integrated is known, and an example of the double nozzle is described in Patent Literature 1.

In the processing nozzle described in Patent Literature 1, the tip position of the inner nozzle is present at a position that is retracted further inside of a tip position of the outer nozzle.

A laser beam is emitted from a center hole of the tip of the inner nozzle to the outside of the nozzle through an assist gas port of the tip of the outer nozzle.

On the other hand, assist gas is jetted from the assist gas port to the outside of the nozzle, the assist gas being obtained by combining gas that passes through the center hole of the inner nozzle and gas that passes through a bypass notch provided between the inner nozzle and the outer nozzle with each other.

CITATION LIST

Patent Literature

[Patent Literature 1]: Japanese Patent No. 3749356

SUMMARY OF THE INVENTION

When the processing nozzle described in Patent Literature 1 is used for laser cutting of a carbon gas laser in which oxygen is used as assist gas, a mild steel sheet can be favorably cut irrespective of the thickness thereof.

On the other hand, it has been found experimentally that, when this processing nozzle is used for cutting of a fiber laser that has rapidly spread in recent years, the amount of bevel in a workpiece of a mild steel sheet having a relatively large thickness tends to increase.

Here, the amount of bevel refers to an increase in kerf width of the opposite side of the nozzle (back side of the workpiece) relative to a kerf width of a nozzle side (front side of the workpiece) after cutting. That is, when the amount of bevel increases, the inclination of a cut edge with respect to an optical axis further increases, and the cut width of the opposite side of the nozzle is widened.

A method of suppressing an increase in the amount of bevel depending on the thickness has yet to be established. Currently, processing has been performed while searching for the optimum condition setting.

Therefore, a device capable of performing favorable cutting stably and effectively irrespective of the thickness of a workpiece is desired.

An object to be achieved by an embodiment is to provide a laser cutting method, a laser cutting nozzle, and a method of manufacturing a laser cutting nozzle, in which favorable cutting can be performed stably and effectively irrespective of the thickness of a workpiece.

A first aspect of an embodiment provides a laser cutting method of cutting a mild steel sheet using a laser beam, the laser cutting method including: using a double nozzle that divides assist gas into an inner flow and an outer flow, and jets the inner flow and the outer flow as a nozzle that emits the laser beam; and selecting and setting a flow ratio between a flow rate of the inner flow and a flow rate of the outer flow depending on a thickness of the mild steel sheet to be cut.

A second aspect of an embodiment provides a laser cutting nozzle including: an inner nozzle that exhibits a tube shape having a through hole on an axis and having a diameter decreasing on a first end portion side and includes a notch extending in the axis direction along an outer peripheral surface on a second end portion side; and an outer nozzle that is fitted to the outer peripheral surface of the inner nozzle and includes a vent passage including the notch and communicating between the first end portion and the second end portion in the axis direction, wherein a minimum flow cross-sectional area of the vent passage matches an opening area of the notch in an end surface on the second end portion side.

A third aspect of an embodiment provides a method of manufacturing a laser cutting nozzle in which a laser cutting nozzle that is a double nozzle including a combination of an inner nozzle and an outer nozzle is manufactured, the method including: forming the inner nozzle that exhibits a tube shape having a through hole on an axis and having a diameter decreasing on a first end portion side and includes a notch extending in the axis direction along an outer peripheral surface on a second end portion side; forming the outer nozzle that is fitted to the outer peripheral surface of the inner nozzle and includes a vent passage including the notch and communicating between the first end portion and the second end portion in the axis direction; and setting a minimum flow cross-sectional area of the vent passage as a flow cross-sectional area of the notch and determining a magnitude of an opening area of the notch or a magnitude of a number of the notches in an end surface on the second end portion side depending on a magnitude of the minimum flow cross-sectional area.

According to an embodiment, favorable cutting can be performed stably and effectively irrespective of the thickness of a workpiece of a mild steel sheet.

MODES FOR CARRYING OUT THE INVENTION

Figure 1:
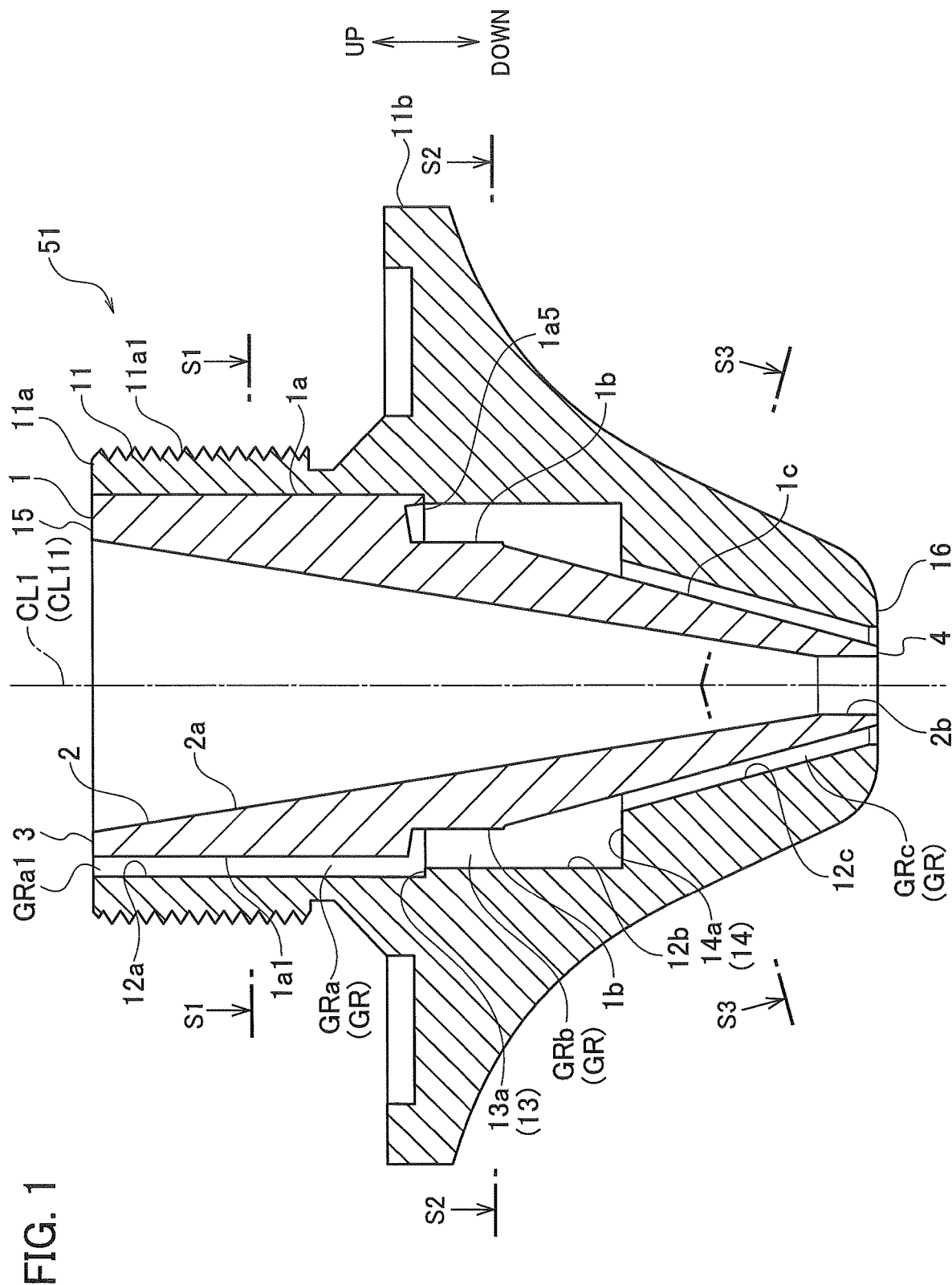
FIG. 1 is a cross-sectional view illustrating a nozzle 51 that is an example of a laser cutting nozzle according to an embodiment.

A laser cutting nozzle according to an embodiment will be described using a nozzle 51 of an example. The nozzle 51 is attachably and detachably mounted on a processing head having a well-known structure in a fiber laser processing machine.

First, a configuration of the nozzle 51 will be described using FIGS. 1 to 4. In the following description, an up-down direction will be defined as a direction indicated by an arrow in the drawings as a direction in a usage posture for convenience of description.

As illustrated in FIG. 1, the nozzle 51 includes a combination of an inner nozzle 1 and an outer nozzle 11.

Figure 2:
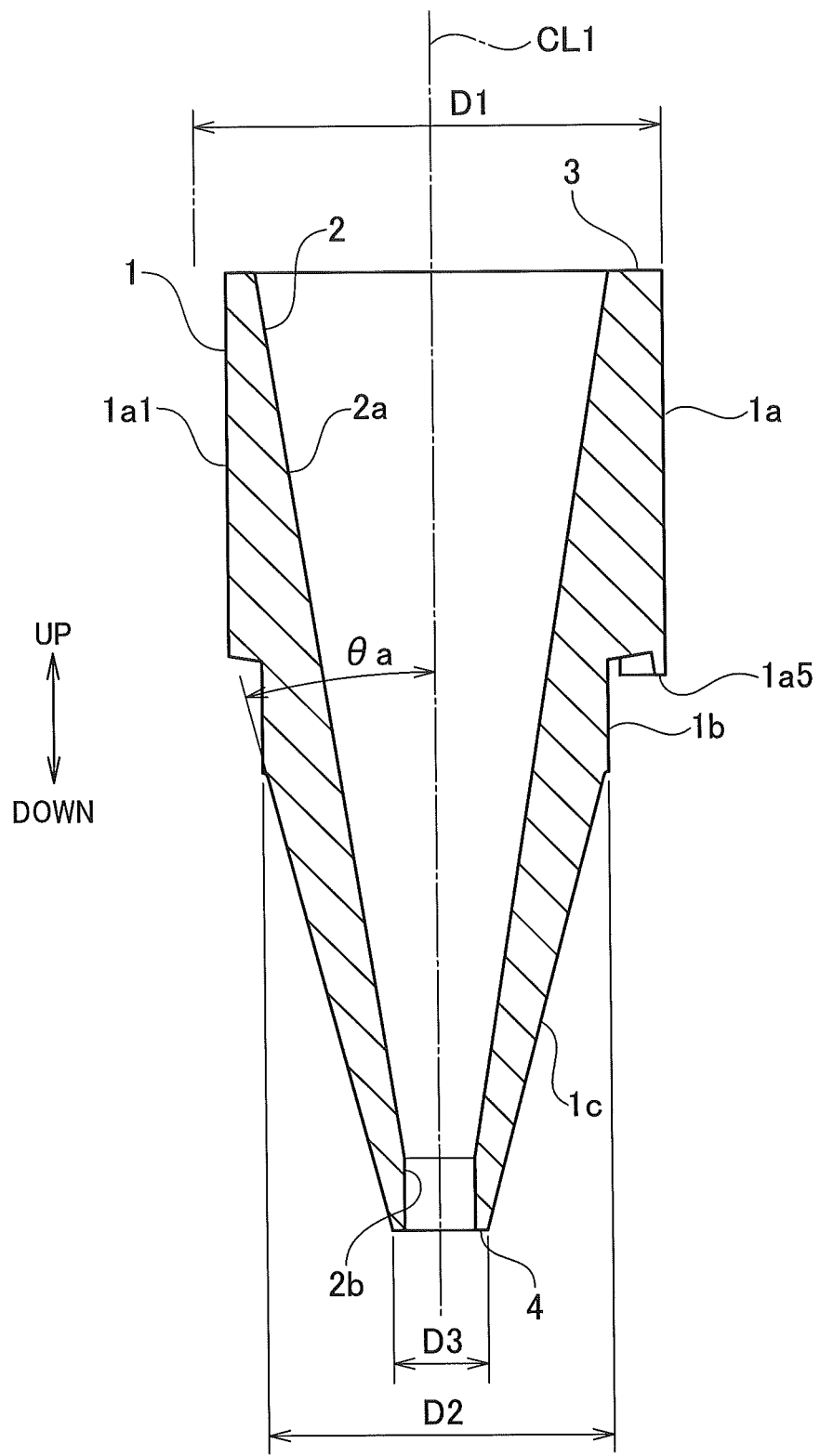
FIG. 2 is a cross-sectional view illustrating an inner nozzle 1 constituting the nozzle 51.
Figure 3:
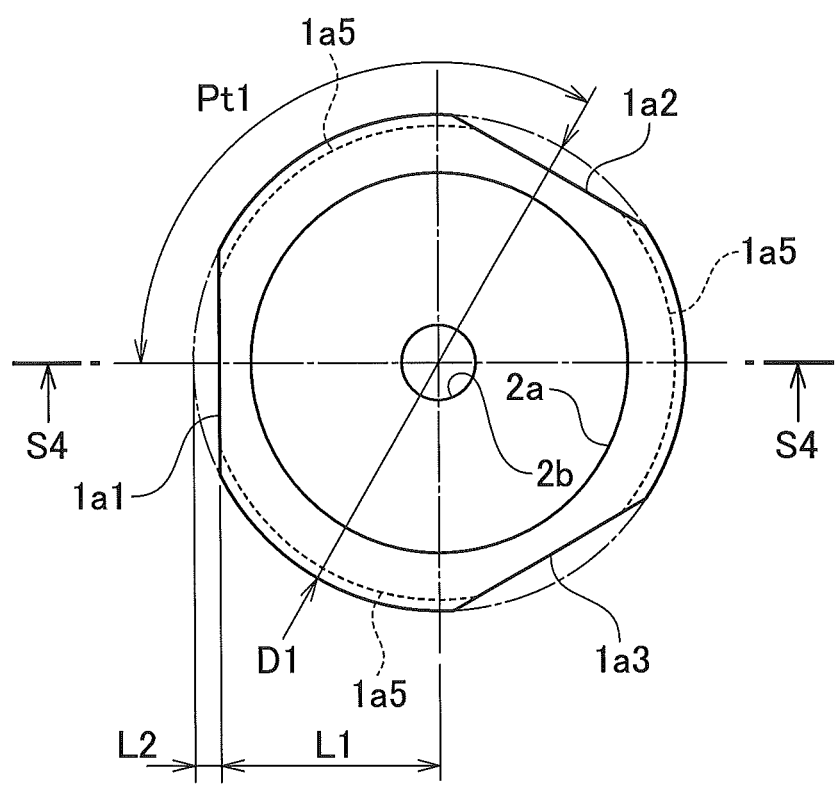
FIG. 3 is a top view illustrating the inner nozzle 1.

The inner nozzle 1 will be described in detail with reference to FIGS. 1 to 3. FIG. 2 is a vertical cross-sectional view illustrating the inner nozzle, and FIG. 3 is a top view illustrating the inner nozzle. FIG. 2 is a cross-sectional view taken at the S4-S4 position in FIG. 3.

As illustrated in FIG. 1 or FIG. 2, the inner nozzle 1 is formed in a tube shape in which an axis CL1 is a central axis.

The inner nozzle 1 includes: a base portion 1a that has an outer diameter D1 and extends in the up-down direction; an intermediate portion 1b that has an outer diameter D2 less than the outer diameter D1 and is connected to a lower portion of the base portion 1a; and a diameter-decreasing portion 1c that is connected to a lower portion of the intermediate portion 1b and has a diameter decreasing toward the lower portion at an inclination angle θa such that the diameter of the tip has an outer diameter D3. In FIG. 2, the inclination angle θa is a minor angle between the diameter-decreasing portion 1c and the axis CL1. The diameter-decreasing portion 1c side will be referred to as "first end portion side", and the base portion 1a side will be referred to as "second end portion side".

As illustrated in FIG. 3, in the base portion 1a, a plurality of D-cut portions 1a1 to 1a3 are formed as notches in a peripheral direction at an angle pitch Pt1. In this example, the angle pitch Pt1 is 120°, and the three D-cut portions 1a1 to 1a3 are formed.

The D-cut portions 1a1 to 1a3 are formed as parallel planes that are parallel to the axis CL1, extend in the up-down direction, and are at a distance L1 from the axis CL1. The maximum cut depth of the D-cut portions 1a1 to 1a3 will be referred to as "distance L2".

That is, Distance L2=(Outer Diameter D1/2)−Distance L1.

In a peripheral portion of a lower end of a portion of the base portion 1a where the D-cut portions 1a1 to 1a3 are not formed, three abutting portions 1a5 that protrude downward in an arc shape are formed. In FIG. 3, an abutting portion 1a5 is indicated by a broken line.

In terms of a step of manufacturing the inner nozzle 1, the abutting portion 1a5 is a portion that remains in an arch shape when a portion that protrudes downward in a ring shape before the formation of the D-cut portions 1a1 to 1a3 is removed after the formation of the D-cut portions 1a1 to 1a3.

As illustrated in FIG. 1 or 2, the inner nozzle 1 includes a through hole 2. The through hole 2 includes: an inner diameter-decreasing portion 2a that has an opening in an upper end surface 3 of the inner nozzle 1 and has a diameter decreasing toward the lower portion; and an output port 2b that is connected to a lower portion of the inner diameter-decreasing portion 2a, has the same inner diameter, and has an opening in a lower end surface 4.

Figure 4:
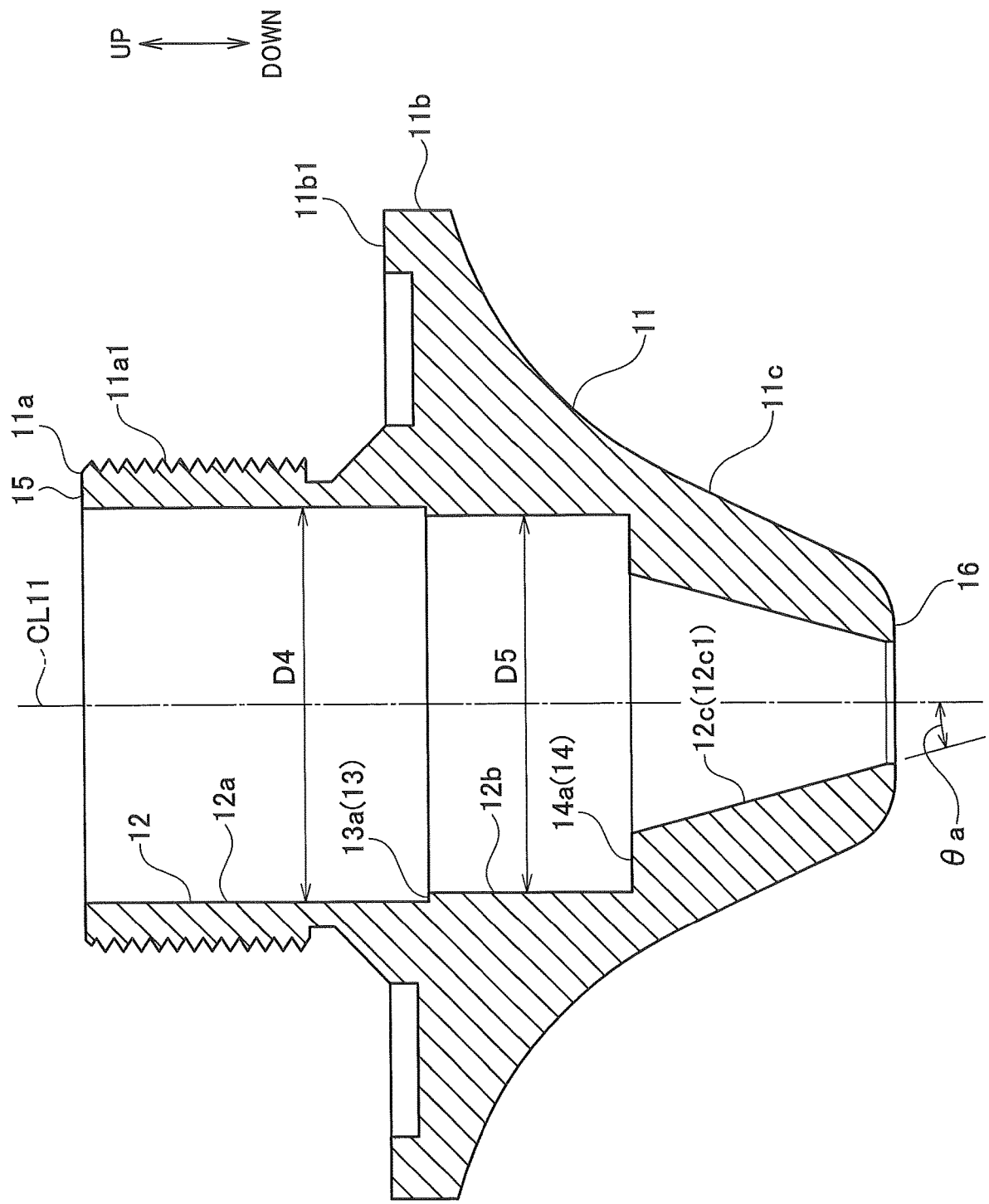
FIG. 4 is a cross-sectional view illustrating an outer nozzle 11 constituting the nozzle 51.

The outer nozzle 11 will be described in detail with reference to FIGS. 1 and 4. The outer nozzle 11 is formed in a tube shape in which an axis CL11 is a central axis.

The outer nozzle 11 includes: a base portion 11a that includes a male screw portion 11a1; a flange portion 11b that includes a surface 11b1 perpendicular to the axis CL11 and overhangs outward in a radial direction; and a diameter-decreasing portion 11c that is connected to a lower surface side of the flange portion 11b and has a diameter decreasing on a curved surface toward the lower tip, the curved surface being recessed toward the axis CL11 side.

The outer nozzle 11 includes a through hole 12 that connects an upper end surface 15 and a lower end surface 16 to each other.

The through hole 12 includes a base hole portion 12a, an intermediate hole portion 12b, and a diameter-decreasing hole portion 12c. The base hole portion 12a has an inner diameter D4 and extends in the up-down direction. The intermediate hole portion 12b includes an upper stage portion 13, has an inner diameter D5 less than the inner diameter D4, and extends downward, the upper stage portion 13 being formed at a lower end of the base hole portion 12 and having an abutting surface 13a perpendicular to the axis CL11. The diameter-decreasing hole portion 12c includes a lower stage portion 14, has a diameter decreasing toward the lower portion, and has an opening in the lower end surface 16 of the outer nozzle 11, the lower stage portion 14 being formed at a lower end of the intermediate hole portion 12b and having a stepped surface 14a perpendicular to the axis CL11. The diameter-decreasing hole portion 12c is inclined at the same inclination angle θa as that of the diameter-decreasing portion 1c of the inner nozzle 1.

A difference between the inner diameter D4 and the inner diameter D5 is 0.4 mm, for example. Accordingly, the width of the abutting surface 13a in the radial direction is 0.2 mm.

On the other hand, the distance L2 (FIG. 3) as the cut depth of the D-cut portions 1a1 to 1a3 is 0.6 mm.

The inner diameter D4 of the outer nozzle 11 is set so as to have an optimum press-fit allowance with respect to the outer diameter D1 of the base portion 1a of the inner nozzle 1.

During assembly of the nozzle 51, the inner nozzle 1 and the outer nozzle 11 are integrated with each other by strongly fitting the inner nozzle 1 to the through hole 12 of the outer nozzle 11 from above.

Specifically, the base portion 1a of the inner nozzle 1 is press-fitted into the base hole portion 12a of the through hole 12 of the outer nozzle 11.

An axial position of the inner nozzle 1 relative to the outer nozzle 11 is positioned by allowing the abutting portion 1a5 of the inner nozzle 1 to abut against the abutting surface 13a of the outer nozzle 11.

In this positioned state, the upper end surface 3 and the lower end surface 4 of the inner nozzle 1 in the nozzle 51 are positioned on substantially the same surfaces (the same axial positions) as the upper end surface 15 and the lower end surface 16 of the outer nozzle 11, respectively.

As illustrated in FIG. 1, the nozzle 51 includes a vent passage GR that communicates between the end surfaces of the inner nozzle 1 and the outer nozzle 11 in the axis direction (the up-down direction) to allow gas circulation independently of the through hole 2 of the inner nozzle 1.

Specifically, the vent passage GR includes three portions including an upper vent passage GRa, an intermediate vent passage GRb, and a lower vent passage GRc from above.

Figure 5:
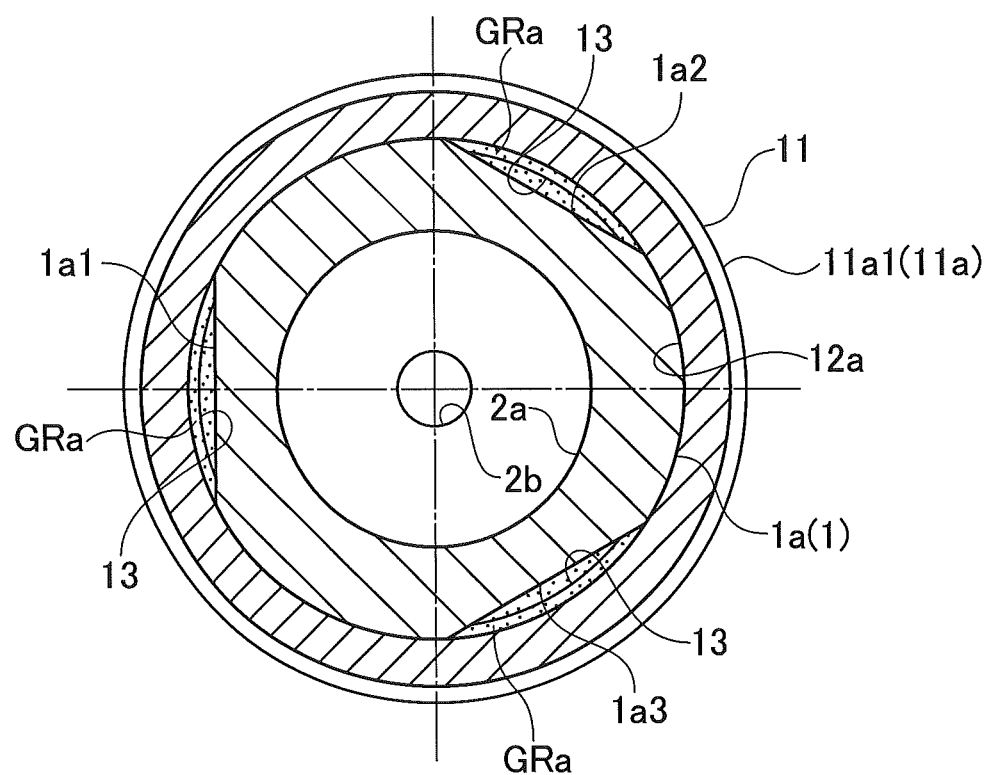
FIG. 5 is a cross-sectional view taken at the S1-S1 position in FIG. 1.
Figure 6:
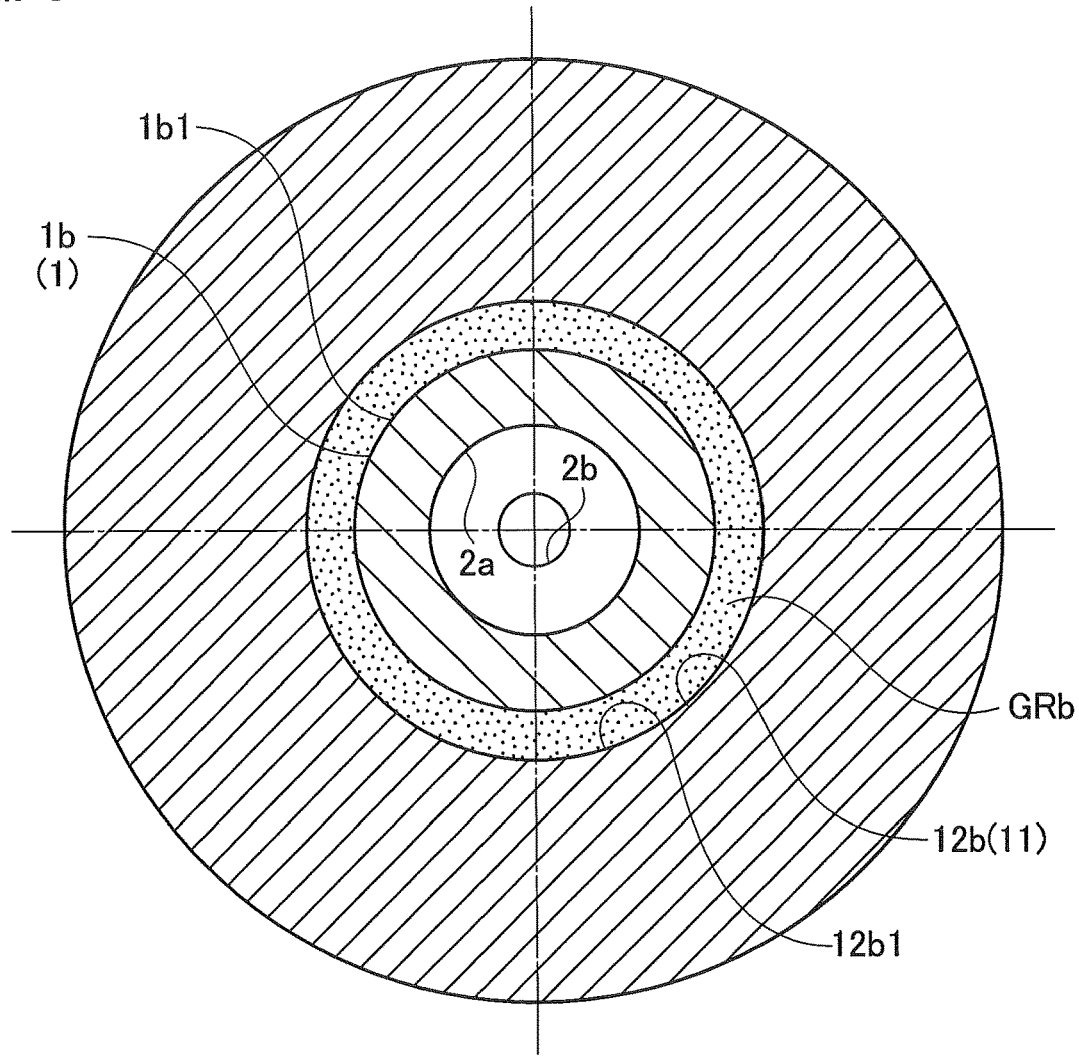
FIG. 6 is a cross-sectional view taken at the S2-S2 position in FIG. 1.
Figure 7:
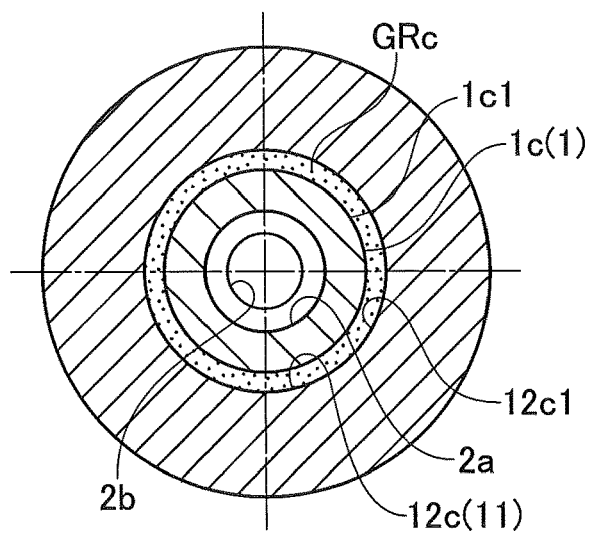
FIG. 7 is a cross-sectional view taken at the S3-S3 position in FIG. 1.

These three portions will be described with reference to FIGS. 5 to 7. FIGS. 5 to 7 are cross-sectional views taken at the S1-S1 position to the S3-S3 position in FIG. 1, respectively. Here, FIG. 7 is a cross-sectional view that is formed by rotating a line perpendicular to an inclined inner peripheral surface of the lower vent passage GRc by 360 degrees in a peripheral direction through any one of positions indicated by S3 in the peripheral direction.

As illustrated in FIG. 5, the upper vent passage GRa is formed as a gap (dot portion) that vertically extends between the D-cut portions 1a1 to 1a3 of the inner nozzle 1 and the base portion 11a of the outer nozzle 11. In this example, the sum of the cross-sectional areas of the respective three gaps (bow-shaped cross-sectional areas surrounded by arcs and strings) will be referred to as "flow cross-sectional area Sa".

As illustrated in FIG. 6, the intermediate vent passage GRb is formed as one ring-shaped space having a lower portion to which the three upper vent passages GRa are connected.

Specifically, the intermediate vent passage GRb is formed as a gap (ring-shaped dot portion) that vertically extends between an outer peripheral surface 1b1 of the intermediate portion 1b of the inner nozzle 1 and an inner peripheral surface 12b1 of the intermediate hole portion 12b of the outer nozzle 11. The cross-sectional area of this ring-shaped gap will be referred to as "flow cross-sectional area Sb".

As illustrated in FIG. 7, the lower vent passage GRc is formed as a gap (ring-shaped dot portion) that extends between an outer peripheral surface 1c1 of the diameter-decreasing portion 1c of the inner nozzle 1 and an inner peripheral surface 11c1 of the diameter-decreasing portion 11c of the outer nozzle 11 and has a diameter increasing toward the upper portion and decreasing toward the lower portion. The lower vent passage GRc is formed as an opening GRc1 surrounded by the output port 2b of the through hole 2 in a lower end surface of the nozzle 51. In this example, the opening GRc1 is ring-shaped, and the area of the opening GRc1 will be referred to as "opening area Sc".

In the nozzle 51, the flow cross-sectional area Sa of the upper vent passage GRa is set to be less than the flow cross-sectional area Sb and the opening area Sc.

More specifically, the flow cross-sectional area Sa of the upper vent passage GRa is set to be the same as the opening area Sa1 in an inflow opening GRa1 (refer to FIG. 1) of the upper end surface 15 of the nozzle 51 and to be less than the cross-sectional area of any position below the upper vent passage GRa in the vent passage GR.

As a result, the flow cross-sectional area of the vent passage GR is a minimum flow cross-sectional area Smin that is the narrowest in the upper vent passage GRa, and a flow rate at which gas flows through the vent passage GR is regulated by the upper vent passage GRa.

Accordingly, when the nozzles 51 having different cross-sectional areas of the vent passages GR are manufactured, the magnitude of a flow rate at which gas flows through the vent passage GR is distinguishable based on a difference in the opening area Sa1 of the inflow opening GRa1 when the nozzle 51 is seen from above.

Figure 8:
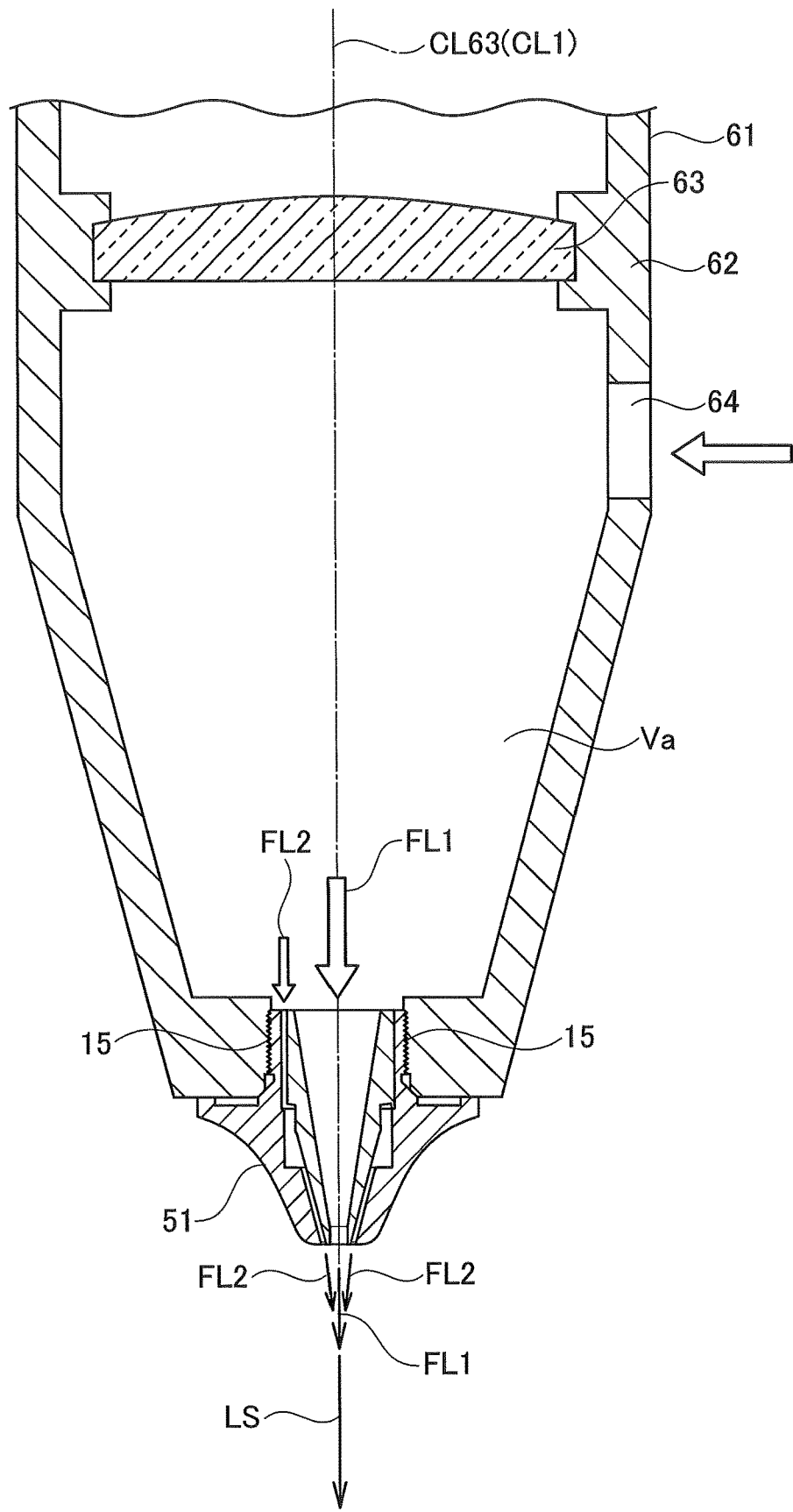
FIG. 8 is a cross-sectional view illustrating a state where the nozzle 51 is attached to a housing 62 of a processing head 61 and the flow of assist gas.

FIG. 8 is a vertical cross-sectional view illustrating an example of a state where the above-described nozzle 51 is attached to a processing head 61. The nozzle 51 is attachably and detachably screwed to the tip of a housing 62 of the processing head 61. In a state where the nozzle 51 is screwed to the housing 62, the axis CL1 matches an optical axis CL63 of a focusing lens 63.

A laser beam LS supplied from a fiber laser oscillator (not illustrated) to the nozzle 51 is focused by the focusing lens 63 and is emitted downward through the through hole 2 of the nozzle 51.

In the housing 62, a gas supply port 64 is provided such that assist gas (for example, oxygen) is supplied from the outside to an inner space Va of the housing 62 through the gas supply port 64.

The assist gas supplied to the inner space Va is divided into an inner flow FL1 and an outer flow FL2, and the inner flow FL1 and the outer flow FL2 are jetted to the outside. That is, a part of the supplied assist gas is jetted downward through the output port 2b of the through hole 2 as the inner flow FL1, and the remaining part of the supplied assist gas enters from the inflow opening GRa1 to the upper vent passage GRa as the outer flow FL2 and is jetted downwardly from the opening GRc1 of the lower vent passage GRc through the intermediate vent passage GRb to surround the inner flow FL1 in a ring shape independently of the inner flow.

Here, the flow rates of the inner flow FL1 and the outer flow FL2 will be referred to as Q1 (L/min) and Q2 (L/min), respectively. Since the inner flow FL1 and the outer flow FL2 are branched from the common inner space Va illustrated in FIG. 8, the pressures of the inner flow FL1 and the outer flow FL2 are equal to each other.

The present inventors focused on a flow ratio Q (=Q2/Q1) between the outer flow FL2 and the inner flow FL1 and experimentally investigated a relationship between the flow ratio Q and the amount of bevel.

Specifically, a plurality of nozzles 51 having different flow ratios Q (=Q2/Q1) between the outer flow FL2 and the inner flow FL1 were prepared by setting the shapes of the through holes 2 of the nozzles 51 to be the same, and for example, changing the distance L2 as the cut depth such that the flow cross-sectional areas Sa of the upper vent passages GRa were different from each other.

A relationship between the flow cross-sectional area Sa and the flow ratio Q was investigated, and workpieces of mild steel sheets having different thicknesses were cut using the respective nozzles 51 to investigate the amounts of bevel of the obtained cut edges. As the mild steel sheet, a sheet formed of SS400 was used.

Figure 9:
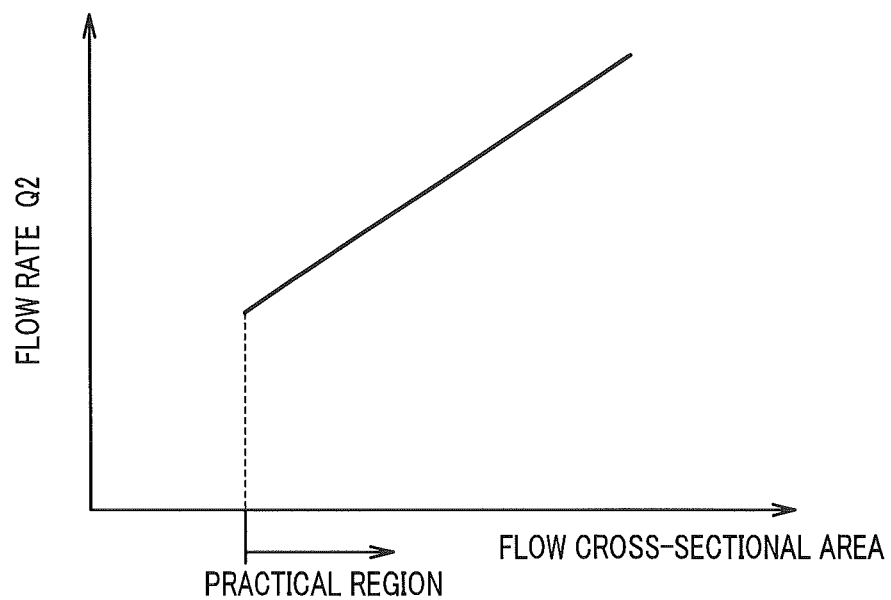
FIG. 9 is a graph illustrating a relationship between a flow cross-sectional area Sa and an outer flow FL2.

As a result, first, it was found that as illustrated in FIG. 9, in a practical region where the flow cross-sectional area Sa of the upper vent passage GRa was not extremely small, the flow cross-sectional area Sa and the flow rate Q2 of the outer flow FL2 had a substantially positive and linear relationship.

Figure 10:
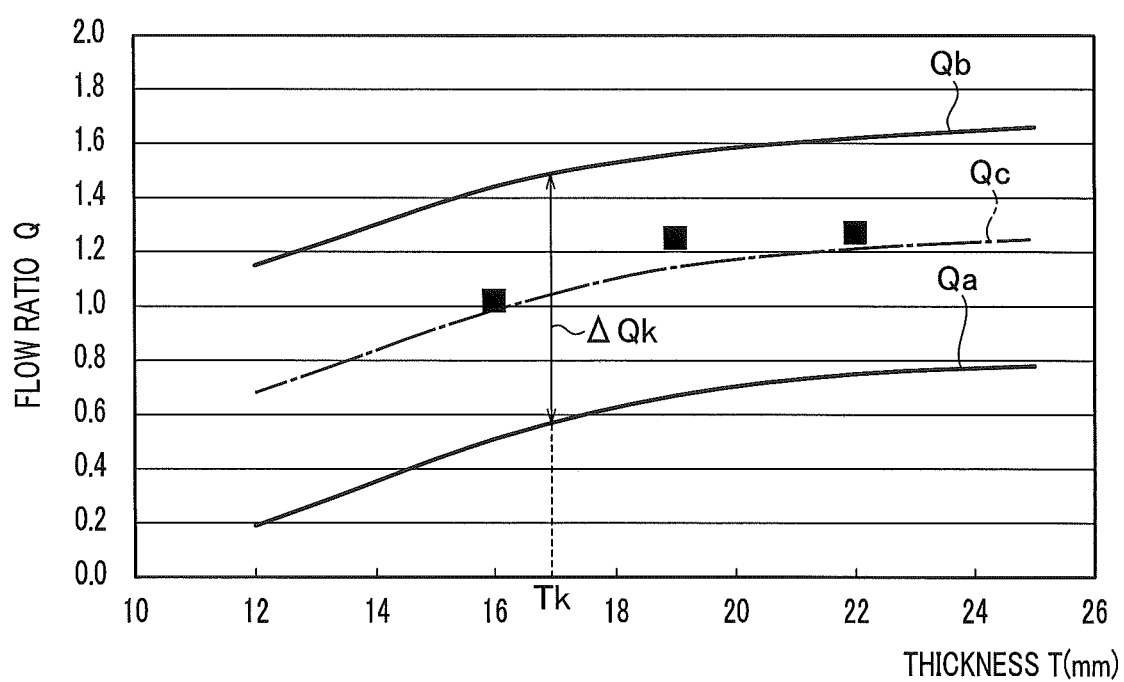
FIG. 10 is a graph illustrating a relationship between a thickness T and a flow ratio Q at which the amount of bevel is in an allowable range.

In addition, when the flow ratios Q, at which the amounts of bevel during the cutting of the respective workpieces having different thicknesses in an allowable range were extracted, the results shown in FIG. 10 were obtained. Here, the allowable range of the amounts of bevel is set to be 0.15 mm or less.

FIG. 10 illustrates a relationship between the thickness T (horizontal axis) of the workpiece of the mild steel sheet and the range of the flow ratio Q (vertical axis) at which the amount of bevel of the cut edge was in the allowable range.

In the following description, a thickness of 12 mm will be referred to as "thickness T1", and a thickness of 25 mm will be referred to as "thickness T2". The thicknesses T1 to T2 are in a typical thickness range of the mild steel sheet provided for fiber laser cutting.

The results illustrated in FIG. 10 will be described in detail.

A flow ratio lower limit characteristic Qa represents the lower limit value of the flow ratio Q at which the amount of bevel is in the allowable range in the thickness range of T1 to T2.

A flow ratio upper limit characteristic Qb represents the upper limit value of the flow ratio Q at which the amount of bevel is in the allowable range in the thickness range of T1 to T2.

A flow ratio intermediate characteristic Qc represents the intermediate value between the flow ratio upper limit characteristic Qb and the flow ratio lower limit characteristic Qa in the thickness range of T1 to T2.

Black squares corresponding to thicknesses of 16 mm, 19 mm, and 22 mm are plotted as a part of a plurality of actual measurement data measured to obtain the characteristics illustrated in FIG. 10.

Specific data of the respective plots are as follows.
Thickness 16 mm
Flow Rate Q1 of Inner Flow FL1=19.6 (L/min)
Flow Rate Q2 of Outer Flow FL2=20.0 (L/min)
Flow Ratio Q=1.02
Amount of Bevel=0.07 mm
Thickness 19 mm
Flow Rate Q1 of Inner Flow FL1=22.1 (L/min)
Flow Rate Q2 of Outer Flow FL2=27.7 (L/min)
Flow Ratio Q=1.25
Amount of Bevel=0.08 mm
Thickness 22 mm
Flow Rate Q1 of Inner Flow FL1=24.9 (L/min)
Flow Rate Q2 of Outer Flow FL2=31.7 (L/min)
Flow Ratio Q=1.27
Amount of Bevel=0.09 mm Here, a range between the flow ratio upper limit characteristic Qb and the flow ratio lower limit characteristic Qa at an any thickness Tk (T1≤Tk≤T2) will be referred to as "appropriate flow ratio range ΔQk".

The following was found from the results illustrated in FIG. 10.

In the range of the thickness T1 to the thickness T2, during cutting using the nozzle 51, the range (appropriate flow ratio range ΔQk) of the flow ratio Q is present, at which the amount of bevel is present in the allowable range.

The appropriate flow ratio range ΔQk is substantially constant in the range of the thickness T1 to the thickness T2.

The flow ratio intermediate characteristic Qc tends to increase as the thickness T increases in the range of the thickness T1 to the thickness T2.

That is, this shows that an appropriate amount of bevel cannot be obtained in the range of the thickness T1 to the thickness T2 when one workpiece (having a large thickness) is cut at a flow ratio Q at which an appropriate amount of bevel can be obtained during cutting of another workpiece (having a small thickness). It can be said that this shows that, when the thickness of a sheet is large during fiber laser cutting using a conventional double nozzle, the amount of bevel increases such that a preferable cut edge cannot be obtained.

Although not directly obtained from FIG. 10, an accompanying result shows that the flow ratio intermediate characteristic Qc is a flow ratio at which the quality of a cut edge after cutting is the most preferable in the appropriate flow ratio range ΔQk.

It was found from this result that a high cutting quality in which the amount of bevel is suppressed can be obtained by performing fiber laser cutting of a workpiece of a mild steel sheet using the nozzle 51 having the flow ratio Q suitable for the thickness T of the workpiece to be cut.

Therefore, it is preferable to perform the fiber laser cutting using the nozzle 51, for example, using the following method, and this method will be described with reference to FIGS. 11 and 12.

The flow ratio lower limit characteristic Qa and the flow ratio upper limit characteristic Qb are obtained in advance to obtain the appropriate flow ratio range ΔQk by test processing per standard thickness determined by JIS (Japanese Industrial Standard) or the like. Here, the flow ratio lower limit characteristic Qa and the flow ratio upper limit characteristic Qb are obtained as characteristics illustrated in FIG. 11.

Nozzles 511 to 515 having flow ratios in the appropriate flow ratio range ΔQk corresponding to thicknesses T11 to T15 among the standard thicknesses of a workpiece, respectively, are prepared.

Figures 11, 12:
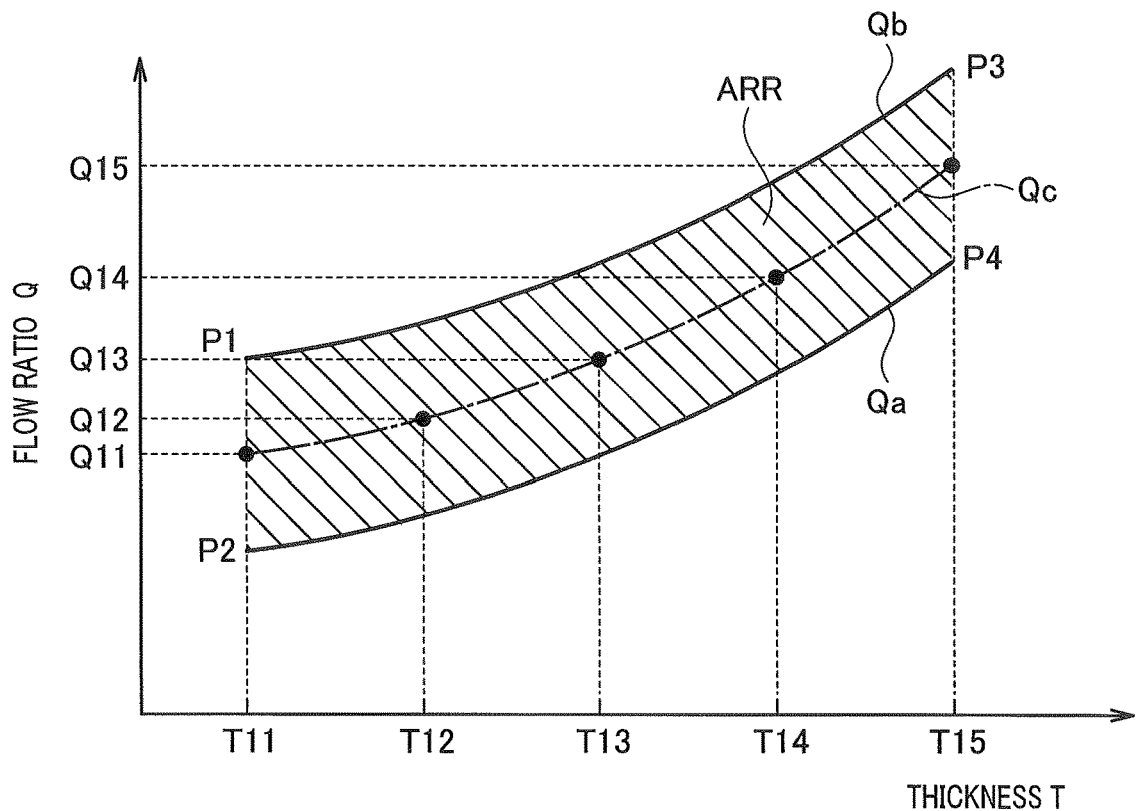
FIG. 11 is a graph illustrating a first association between the thickness T and the flow ratio Q to be set.
FIG. 12 is a table illustrating an association between the thicknesses T11 to T15, flow ratios Q11 to Q15, and nozzles 511 to 515.

Here, as illustrated in FIG. 12, the nozzles 511 to 515 are prepared to have flow ratios Q11 to Q15 as flow ratio intermediate characteristics Qc corresponding to the thicknesses T11 to T15.

Each of the nozzles 511 to 515 corresponding to the thicknesses T11 to T15 of workpieces to be processed is selected and mounted on the processing head 61, and a fiber laser processing machine processes each of the workpieces. For example, when a workpiece having the thickness T13 is cut, the nozzle 513 is selected and mounted on the processing head 61 for cutting.

During the preparation of the nozzle 51, it is preferable that the value of the flow ratio intermediate characteristic Qc is adopted as the flow ratio Q set depending on the thickness T from the viewpoint of obtaining a high-quality cutting edge. However, the adopted value of flow ratio Q is not limited to the value of the flow ratio intermediate characteristic Qc, and may be a value corresponding to each thickness T in an appropriate flow ratio range ARR (a hatched region surrounded by points P1 to P4 in FIG. 11) obtained by the appropriate flow ratio range ΔQk.

Therefore, instead of preparing different nozzles 51 depending on the thicknesses of workpieces to be processed, thicknesses adjacent to each other in the appropriate flow ratio range ARR may be associated with the same nozzle 51 as much as possible.

This method will be described with reference to FIGS. 13 and 14.

Figures 13, 14:
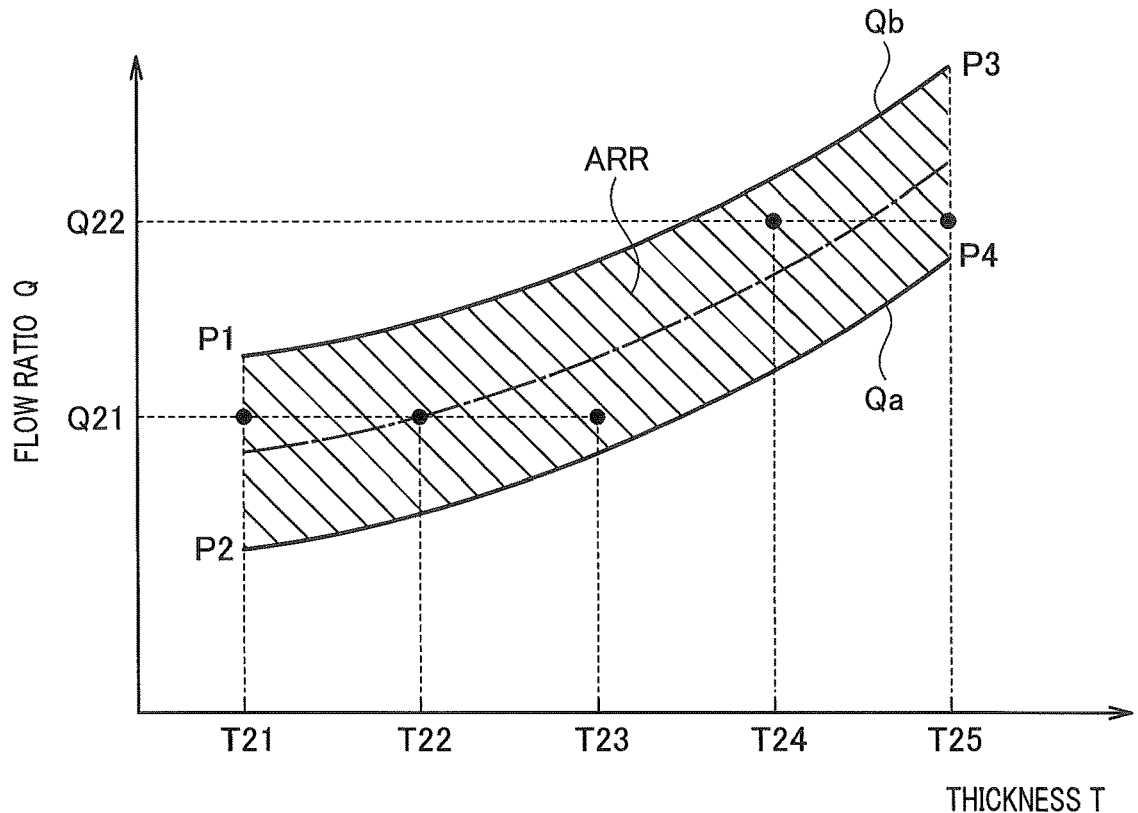
FIG. 13 is a graph illustrating a second association between the thickness T and the flow ratio Q to be set.
FIG. 14 is a table illustrating an association between the thicknesses T21 to T25, flow ratios Q21 and Q22, and nozzles 521 and 522.

For convenience of description, it is assumed that the flow ratio lower limit characteristic Qa and the flow ratio upper limit characteristic Qb in FIG. 13 are the same as those in FIG. 11 in the range of the thickness T21 to the thickness T25.

As illustrated in FIGS. 13 and 14, a flow ratio Q21 in the appropriate flow ratio range ARR is set for all the thicknesses T21 to T23. A nozzle 521 having the flow ratio Q21 is prepared and is associated with the thicknesses as illustrated in FIG. 14.

On the other hand, for the thicknesses T24 and T25, the flow ratio Q21 deviates from the appropriate flow ratio range ARR. Therefore, a flow ratio Q22 that is in the appropriate flow ratio range ARR and is different from the flow ratio Q21 is set for the thicknesses T24 and T25. A nozzle 522 having the flow ratio Q22 is prepared and is associated with the thicknesses.

In this method, it is not necessary to prepare a nozzle for each of the thicknesses having different values of the flow ratio intermediate characteristic Qc. Therefore, the costs can be reduced from the viewpoint of manufacturing and nozzle management, the nozzle replacement time can be reduced, and a decrease in production efficiency can be suppressed.

In the nozzles having different flow ratios Q, for example, the nozzles 511 to 515 illustrated in FIG. 12, the structure of positioning the inner nozzle 1 relative to the outer nozzle 11 in the axial direction is as follows.

That is, the width of the abutting portion 1a5 of the outer nozzle 11 in the radial direction against which the abutting portion 1a5 of the inner nozzle 1 abuts is set to be sufficiently smaller than the maximum cut distance L2 of the D-cut portions 1a1 to 1a3 such that the abutting portion 1a5 is not the minimum aperture.

In this way, a portion having the minimum aperture, that is, the minimum flow cross-sectional area Smin in the vent passage GR, is set as the upper vent passage GRa.

A difference in the flow ratio Q is reflected as a difference in the opening area Sa1 between the upper end surface 3 and the upper end surface 15. That is, the nozzles 511 to 515 can be distinguished based on the external appearances.

As a result, with the nozzles 511 to 515, the possibility that the nozzle is erroneously mounted on the housing 62 of the processing head 61 can be reduced, and optimum cutting for the thickness T of a workpiece can be reliably performed.

As described above, in the nozzle 51, the lower end surface 4 of the inner nozzle 1 and the lower end surface 16 of the outer nozzle 11 are present at substantially the same height position (axial position).

As a result, the inner flow FL1 and the outer flow FL2 are jetted to a workpiece as independent gas flows without being mixed and jetted.

Therefore, the flow ratio Q directly affects the cutting form and is effective as a parameter for controlling the amount of bevel.

Of course, even when a step is generated due to a difference in height between the lower end surface 4 of the inner nozzle 1 and the lower end surface 16 of the outer nozzle 11, the flow ratio Q is effective as a parameter for controlling the amount of bevel as long as the inner flow FL1 and the outer flow FL2 are jetted to a workpiece as independent gas flows. In addition, it is needless to say that, even when the degree of a step between the lower end surfaces 4 and 16 in the height direction (a difference between the positions in the height direction) is high such that the independency of the inner flow FL1 and the outer flow FL2 decreases, the effect of the flow ratio Q controlling the amount of bevel may be small, but can be exhibited as long as the independency is secured to some extent.

The reason why an increase in the amount of bevel can be suppressed by increasing the flow ratio Q in a region having a relatively large thickness as described above is presumed to be as follows.

That is, by increasing the flow ratio Q, the proportion of the flow rate of the outer flow FL2 with respect to the flow rate of the inner flow FL1 is increased, the outer flow FL2 that is an inclined reflux converging on the axis CL1. As a result, in a lower portion of a workpiece (opposite to the nozzle), flux extension of the assist gas as a whole is suppressed, and the supply of an excess amount of oxygen can be avoided.

The example of the embodiment is not limited to the above-described configuration and procedure and can be modified within a range not departing from the scope of the present invention.

In the above description, the base portion 1a of the inner nozzle 1 includes the three D-cut portions 1a1 to 1a3 as the notches forming the upper vent passages GRa. However, the number N of notches is not limited to three.

Figure 15A:
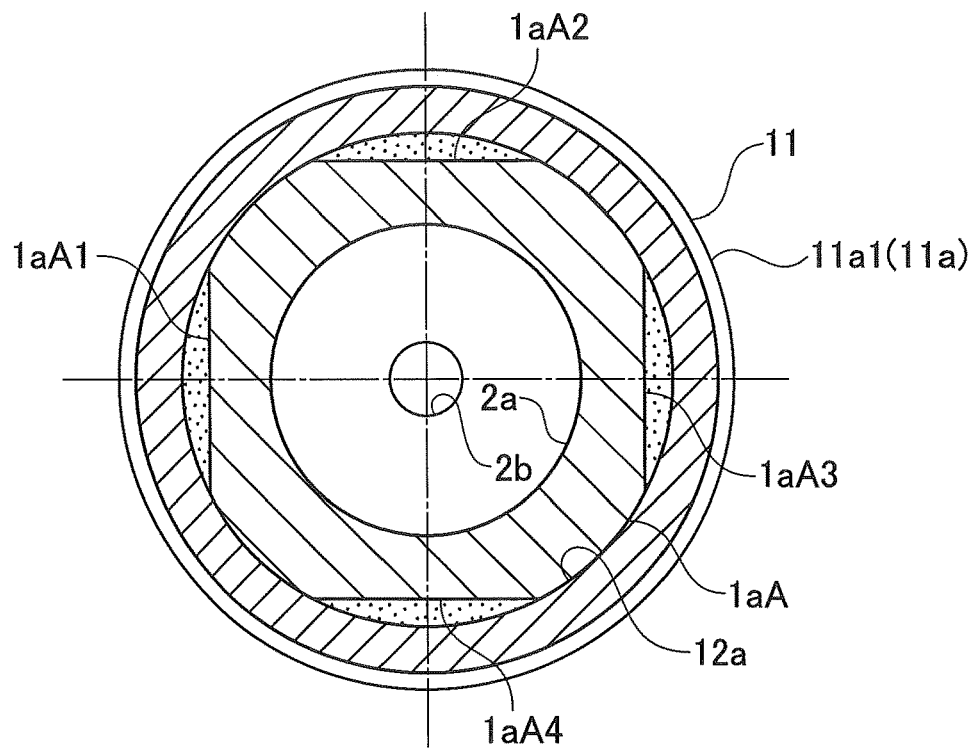
FIG. 15A is a cross-sectional view illustrating a base portion 1aA that is a modification example of a base portion 1a of the nozzle 1.

For example, as illustrated in FIG. 15A, instead of the base portion 1a, a base portion 1aA including four D-cut portions 1aA1 to 1aA4 as notches may be used. In addition, the cross-sectional shape is not necessarily the D-cut form. For example, as illustrated in FIG. 15B, instead of the base portion 1a, for example, a base portion 1aB may be used including grooves 1aB1 to 1aB4 as notches that extend in a rectangular cross-sectional shape in the up-down direction.

Figure 15B:
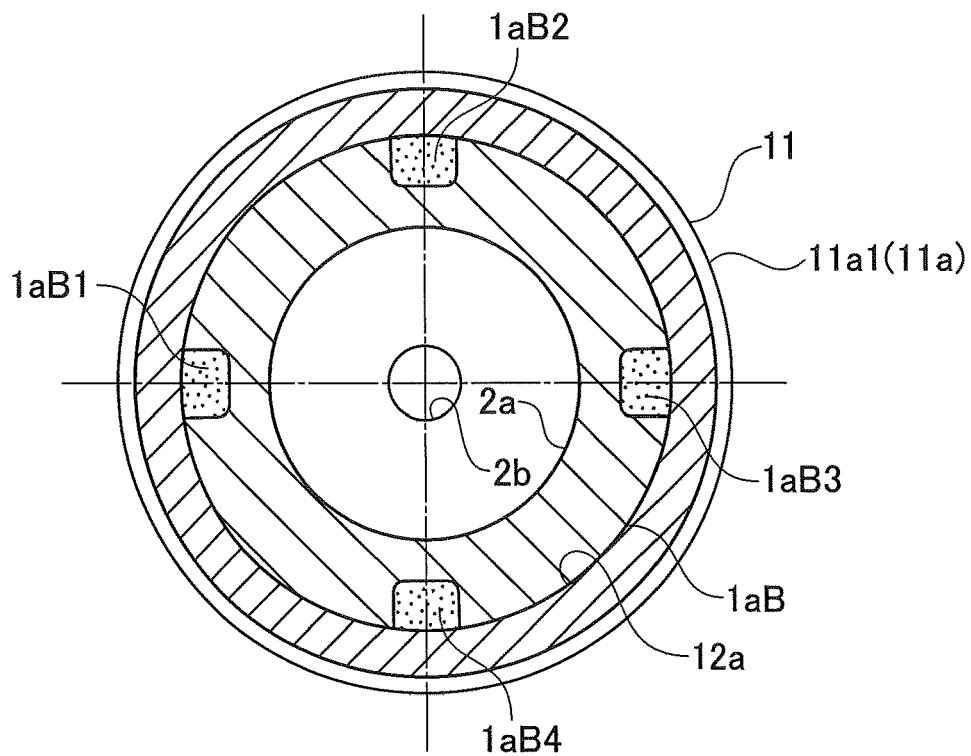
FIG. 15B is a cross-sectional view illustrating a base portion 1aB that is a modification example of the base portion 1a of the nozzle 1.

In FIGS. 15A and 15B, the portion corresponding to the vent passage GRa formed by the notch are indicated by dots.

A difference between the flow ratios Q of the nozzles illustrated in FIGS. 12 and 14 may correspond to the number N of notches that forms the upper vent passages GRa.

Nozzles having different flow ratios Q can be classified based on the number N of notches, in other words, the number N of inflow openings GRa1 instead of a difference in the opening area Sa1. Therefore, the classification work can be performed with high efficiency and reduced determination error.

In the description of the above example, when nozzles having different flow ratios Q are prepared, the inner diameter dimensions of the through holes 2 of the inner nozzles 1 are common. However, the inner diameter dimensions of the through holes 2 may be different from each other.

When the inner diameter dimensions of the through holes 2 may be different from each other, a difference in the opening area Sa1 of the upper vent passage GRa does not directly correspond to a difference in the flow ratio Q. Therefore, it is preferable that the number N of notches is associated with the flow ratio Q.

In the description of the above example, the flow ratio lower limit characteristic Qa and the flow ratio upper limit characteristic Qb are determined based on a criterion that the amount of bevel is equal to or less than a predetermined value. However, not only the amount of bevel but also the total quality of a cut edge including the amount of bevel depend on the flow ratio Q. Therefore, the flow ratio lower limit characteristic Qa and the flow ratio upper limit characteristic Qb may be determined based on an item other than the amount of bevel, for example, the magnitude of surface roughness or the amount of attachment. Of course, the flow ratio lower limit characteristic Qa and the flow ratio upper limit characteristic Qb may be determined based on whether or not the total quality of a cut edge is good or bad.

Regarding the flow cross-sectional area of the vent passage GR, the opening area Sc of the opening GRc1 of the lower vent passage GRc may be the minimum flow cross-sectional area Smin. In this case, the flow rate at which gas flows through the vent passage GR is regulated by the opening GRc1.

In other words, the opening area Sc of the opening GRc1 of the lower vent passage GRc is set to be less than the flow cross-sectional area Sa of the upper vent passage GRa and to be less than the flow cross-sectional area Sb of the intermediate vent passage GRb.

In this case, when the nozzles 51 having different minimum flow cross-sectional areas Smin are manufactured, the magnitude of a flow rate at which gas flows through the vent passage GR is distinguishable based on a difference in the opening area Sc of the inflow opening GRc1 when the nozzle 51 is seen from below.

The present disclosure relates to the subject matter disclosed in Japanese Patent Application No. 2017-146747 filed on Jul. 28, 2017, the entire contents of which are incorporated herein by reference.

It should be noted that various modifications or changes can be made for the above-described embodiments without departing from the new and advantageous characteristics of the present invention. Accordingly, all the modifications or changes are intended to be included in the accompanying claims.

The invention claimed is:

1. A laser cutting nozzle, comprising:
an inner nozzle that exhibits a tube shape having a through hole on an axis and having a diameter decreasing on a first end portion side and includes a notch extending in a direction of the axis along an outer peripheral surface on a second end portion side, the first end portion side being a bottom side of the inner nozzle, the second end portion side being a top side of the inner nozzle, and a supplied assist gas for laser cutting is divided into an inner flow and an outer flow, the inner flow passing through the through hole of the inner nozzle and jetted from the first end portion side; and
an outer nozzle that is fitted to the outer peripheral surface of the inner nozzle and includes a vent passage including the notch and communicating between the first end portion side and the second end portion side in the direction of the axis, and the outer flow passing through the vent passage and jetted from a third end portion side which is a bottom side of the outer nozzle,
wherein the vent passage comprises an upper vent passage, an intermediate vent passage, and a lower vent passage, the upper vent passage being located at the second end portion side and a fourth end portion side which is a top side of the outer nozzle, the lower vent passage being located at the first end portion side and the third end portion side, the intermediate vent passage being located between the upper vent passage and the lower vent passage,
the opening area of the notch in an end surface on the second end portion side is defined by a plurality of spaced apart opening area regions formed in the end surface on the second end portion side,
the upper vent passage includes the plurality of spaced apart opening area regions and is not formed as a ring-shaped space,
the intermediate vent passage is formed as a ring-shaped space to which the plurality of spaced apart opening area regions are connected,
the lower vent passage is formed as a ring-shaped space to which the intermediate vent passage is connected,
a flow cross-sectional area of the upper vent passage is set to be less than both a flow cross-sectional area of the intermediate vent passage and a flow cross-sectional area of the lower vent passage, wherein
a minimum flow cross-sectional area of the vent passage equals an opening area of the notch in the end surface on the second end portion side.

2. The laser cutting nozzle according to claim 1, wherein
the outer nozzle exhibits a tube shape having a through hole extending on the axis and having a diameter decreasing on the third end portion side, and
an end surface of the inner nozzle on the first end portion side and an end surface of the outer nozzle on the third end portion side are positioned at a same axial position in the direction of the axis.

3. A laser cutting method of cutting a workpiece using the laser cutting nozzle according to claim 1, the laser cutting method comprising:
selecting the laser cutting nozzle according to a thickness of the workpiece to be cut from a plurality of kinds of nozzles with different opening areas of the notch as the laser cutting nozzle; and
using the selected laser cutting nozzle to cut the workpiece.

4. The laser cutting method according to claim 3, further comprising:
setting the opening area correspond to a flow ratio of the outer flow to the inner flow, when the assist gas is divided into the inner flow jetted from the through hole and the outer flow jetted from the vent passage, and obtaining flow ratios at which an amount of bevel generated by laser cutting is equal to or less than a predetermined value according to each thickness of workpieces; and
using the selected laser cutting nozzle having an opening area corresponding to a flow ratio at which the amount of bevel is equal to or less than the predetermined value according to the thickness of the workpiece to be cut.

* * * * *